(12) United States Patent
DiCostanzo et al.

(10) Patent No.: US 8,871,404 B2
(45) Date of Patent: *Oct. 28, 2014

(54) FUEL CELL SYSTEM MANIFOLD SEAL

(71) Applicant: FuelCell Energy, Inc., Danbury, CT (US)

(72) Inventors: Glenn DiCostanzo, Woodbury, CT (US); Dana Kelley, New Milford, CT (US); Louis Ernst, Jr., Yorktown Heights, NY (US)

(73) Assignee: FuelCell Energy, Inc., Danbury, CT (US)

( * ) Notice: Subject to any disclaimer, the term of this patent is extended or adjusted under 35 U.S.C. 154(b) by 21 days.

This patent is subject to a terminal disclaimer.

(21) Appl. No.: 13/932,644

(22) Filed: Jul. 1, 2013

(65) Prior Publication Data

US 2013/0295490 A1    Nov. 7, 2013

Related U.S. Application Data

(63) Continuation of application No. 12/608,175, filed on Oct. 29, 2009, now Pat. No. 8,541,144.

(51) Int. Cl.
*H01M 2/38* (2006.01)
*H01M 8/04* (2006.01)
*H01M 8/24* (2006.01)
*H01M 8/14* (2006.01)

(52) U.S. Cl.
CPC .......... *H01M 8/04201* (2013.01); *Y02E 60/526* (2013.01); *H01M 2008/147* (2013.01); *Y02E 60/50* (2013.01); *H01M 8/2485* (2013.01)
USPC ............................ 429/458; 429/459; 429/460

(58) Field of Classification Search
USPC .......................................... 429/458, 459, 460
See application file for complete search history.

(56) References Cited

U.S. PATENT DOCUMENTS

| 4,337,571 A | 7/1982 | Grevstad et al. |
| 4,467,018 A | 8/1984 | Schroll |
| 4,849,308 A | 7/1989 | Schmitten et al. |

(Continued)

FOREIGN PATENT DOCUMENTS

JP        2009238427 A    10/2009

OTHER PUBLICATIONS

International Search Report issued in PCT Application No. PCT/US2010/053505 dated Dec. 22, 2010.

(Continued)

*Primary Examiner* — Jane Rhee
(74) *Attorney, Agent, or Firm* — MKG, LLC

(57) ABSTRACT

A manifold seal for a fuel cell system includes a sealing area defined by a peripheral portion of a fuel cell stack of the fuel cell system and a portion of an end plate positioned on the fuel cell stack. The manifold seal includes a manifold frame defining a mating surface which sealingly engages the sealing area. The mating surface has a slot formed therein which opens towards the sealing area. The manifold seal includes a bracket defining a base portion and having a lip projecting from an edge thereof. The base portion is moveably secured to a face of the end plate so that the edge is positioned on the sealing area. The base portion is positioned inwardly from the sealing area and the manifold frame. The lip is moveably engaged in and cooperates with the slot to seal a gap between the mating surface and the sealing area.

22 Claims, 5 Drawing Sheets

(56) References Cited

U.S. PATENT DOCUMENTS

| | | |
|---|---|---|
| 5,110,692 A | 5/1992 | Farooque et al. |
| 5,478,663 A | 12/1995 | Cipollini et al. |
| 6,887,611 B2 | 5/2005 | Cramer et al. |
| 6,964,825 B2 | 11/2005 | Farooque et al. |
| 7,276,304 B2 | 10/2007 | Kelley et al. |
| 7,294,427 B2 | 11/2007 | Kelley et al. |
| 8,088,697 B2 | 1/2012 | Yuh et al. |
| 2003/0124409 A1 | 7/2003 | Cramer et al. |
| 2007/0141437 A1 | 6/2007 | Siciliano et al. |

OTHER PUBLICATIONS

Office Action issued in corresponding U.S. Appl. No. 12/608,175 dated Mar. 28, 2013.

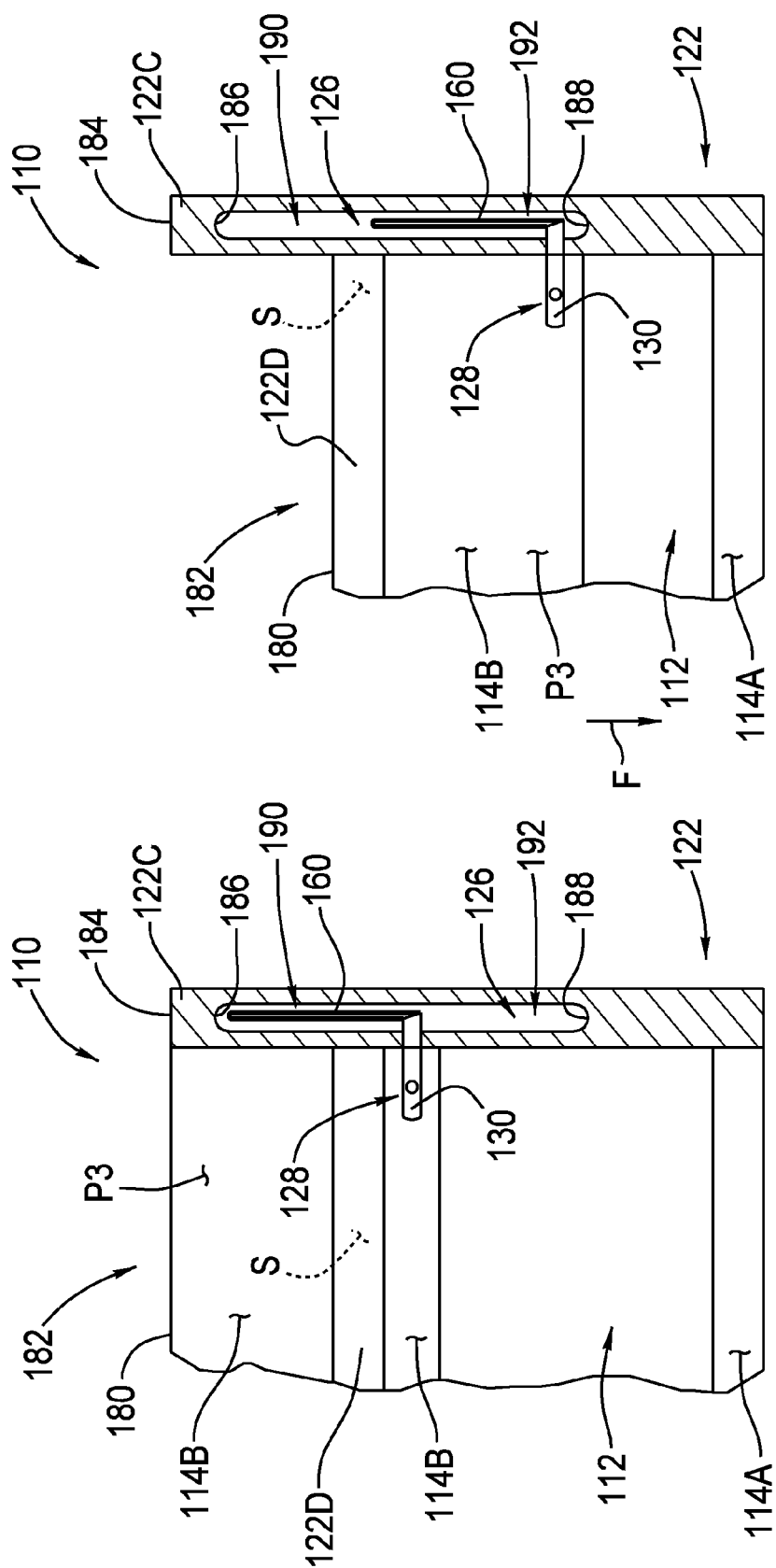

FUEL CELL SYSTEM MANIFOLD SEAL

CROSS REFERENCE TO RELATED APPLICATION

This application is a Continuation Application of U.S. patent application Ser. No. 12/608,175, filed on Oct. 29, 2009, which issued as U.S. Pat. No. 8,541,144 on Sep. 24, 2013, the contents of which are incorporated herein by reference in its entirety and the benefits are fully claimed herein.

FIELD OF THE INVENTION

The present invention generally relates to a seal for use in a fuel cell system manifold and more specifically relates to sealing a gap between the manifold and an end plate of the fuel cell system.

BACKGROUND OF THE INVENTION

A fuel cell is a device which uses an electrochemical reaction to convert chemical energy stored in a fuel such as hydrogen or methane into electrical energy. In general, fuel cells include an anode to catalytically react with the fuel and a cathode in fluid communication with an oxidant such as air.

Fuel cells are typically arranged in a stacked relationship. A fuel cell stack includes many individual cells positioned between a fixed end plate and a free end plate. One fuel cell stack configuration includes an externally manifolded stack, wherein the fuel cell stack is left open on its sides and a fluid such as a fuel or oxidant is delivered by way of manifolds sealed to peripheral portions of respective sides of the fuel cell stack. The manifolds thus provide sealed passages for delivering the fuel and the oxidant gases to the fuel cells and directing the flow of such gases in the stack, thereby preventing those gases from leaking either to the environment or to the other manifolds.

Such manifolds are typically used in Molten Carbonate Fuel Cells (MCFC) which operate at approximately 650° C. During operation of MCFCs, the fuel cells can move relative to the end plates.

SUMMARY OF THE INVENTION

The present invention resides, in one aspect, in a manifold seal for a fuel cell system. The manifold seal includes a sealing area defined by a peripheral portion of a fuel cell stack of the fuel cell system and a portion of an end plate positioned on the fuel cell stack. The manifold seal includes a manifold frame that defines a mating surface which sealingly engages the sealing area. The manifold seal also includes a bracket defining a base portion and having a lip projecting from an edge thereof. The base portion is moveably secured to a face of the end plate so that the edge is positioned on the sealing area. The lip is moveably engaged in and cooperates with a slot defined by the manifold to seal a gap formed between the mating surface and the sealing area caused by movement of the fuel cell stack during operation.

In one embodiment, the lip of the bracket defines a leg extending laterally therefrom. A gasket is positioned in a space between the leg and the end plate. The leg slidingly engages the gasket and during operation, the leg moves in the slot from a beginning of stack life section to an end of stack life section.

The present invention also resides in a manifold seal for a fuel cell system that includes a sealing area defined by a peripheral portion of a fuel cell stack of the fuel cell system and a portion of an end plate positioned on the fuel cell stack. The manifold seal includes a manifold frame defining a mating surface which sealingly engages the sealing area. The mating surface has a slot formed therein which opens towards the sealing area. The manifold seal includes a bracket defining a base portion and having a lip projecting from an edge thereof. The base portion is moveably secured to a face of the end plate so that the edge is positioned on the sealing area. The base portion is positioned inwardly from the sealing area and the manifold frame. The lip is moveably engaged in and cooperates with the slot to seal a gap between the mating surface and the sealing area.

DESCRIPTION OF THE DRAWINGS

FIG. 5 is a schematic side view of a free end portion of the fuel cell system of FIG. 1, at the beginning of the fuel cell stack life.

FIG. 6 is a schematic side view of the free end portion of the fuel cell system of FIG. 1, at the end of life of the fuel cell stack.

DETAILED DESCRIPTION OF THE PREFERRED EMBODIMENTS

Figure 1:
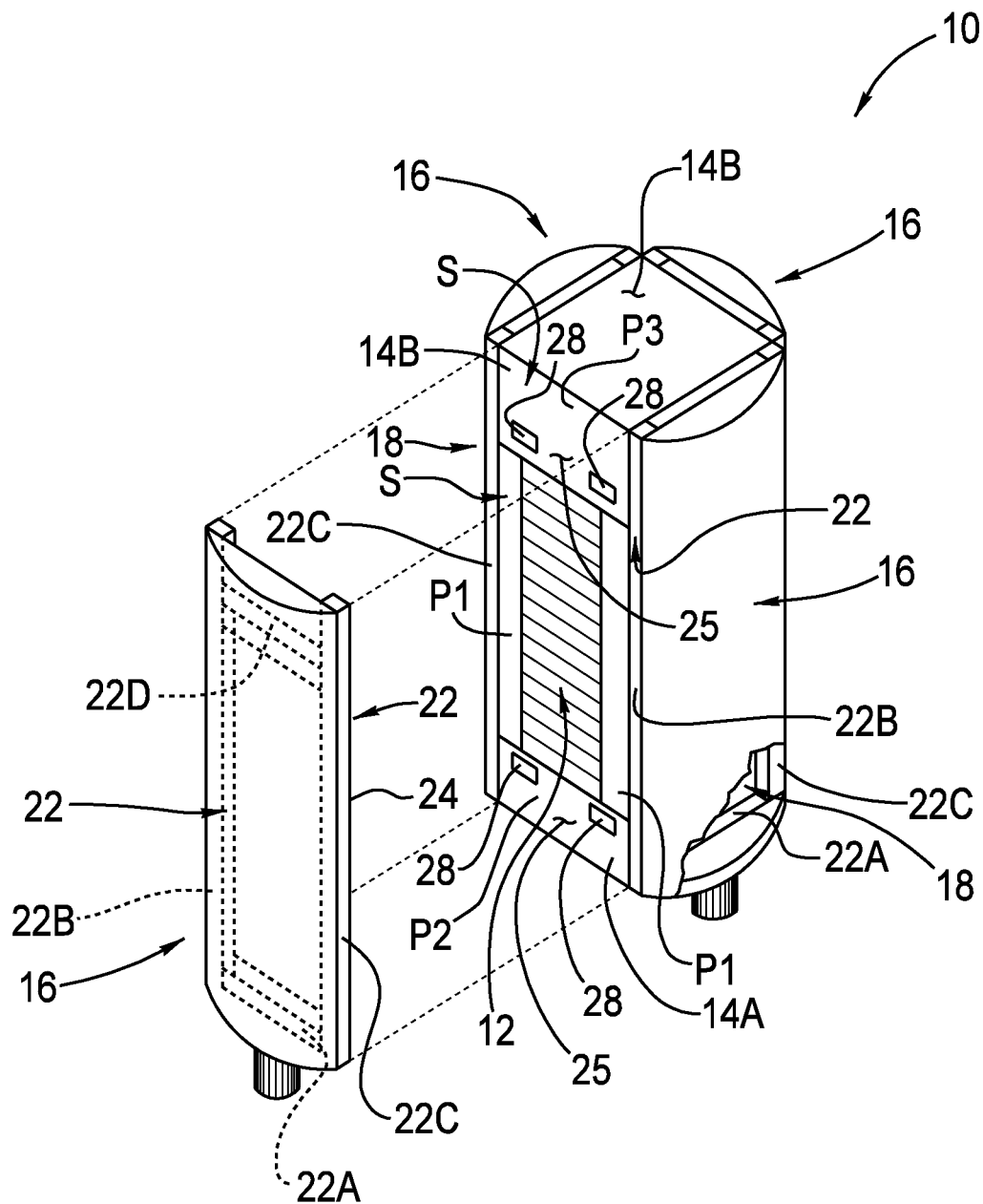
FIG. 1 is a perspective view of a fuel cell system with three manifolds secured thereto and one manifold disassembled therefrom.

Referring to FIG. 1 a fuel cell system, generally designated by the numeral 10 includes a Molten Carbonate Fuel Cell (MCFC) stack 12 positioned between opposing end plates 14A and 14B. A manifold 16 is positioned on three of four outwardly facing surfaces 18 of the fuel cell system 10 for directing a fluid such as fuel or an oxidant into or out of the fuel cell stack. A generally rectangular sealing area S extends around a peripheral portion of each of the outwardly facing surfaces 18. The sealing area S is defined by a peripheral area P1 of the fuel cell stack and portions P2 and P3 of the endplates 14A and 14B, respectively. Each of the manifolds 16 has a portion thereof secured to a portion of the portion P2 of the end plate 14A. During operation of the fuel cell system 10, each of the manifolds 16 is moveable relative to the portions P1 and P3 of the respective sealing area S.

Figure 2:
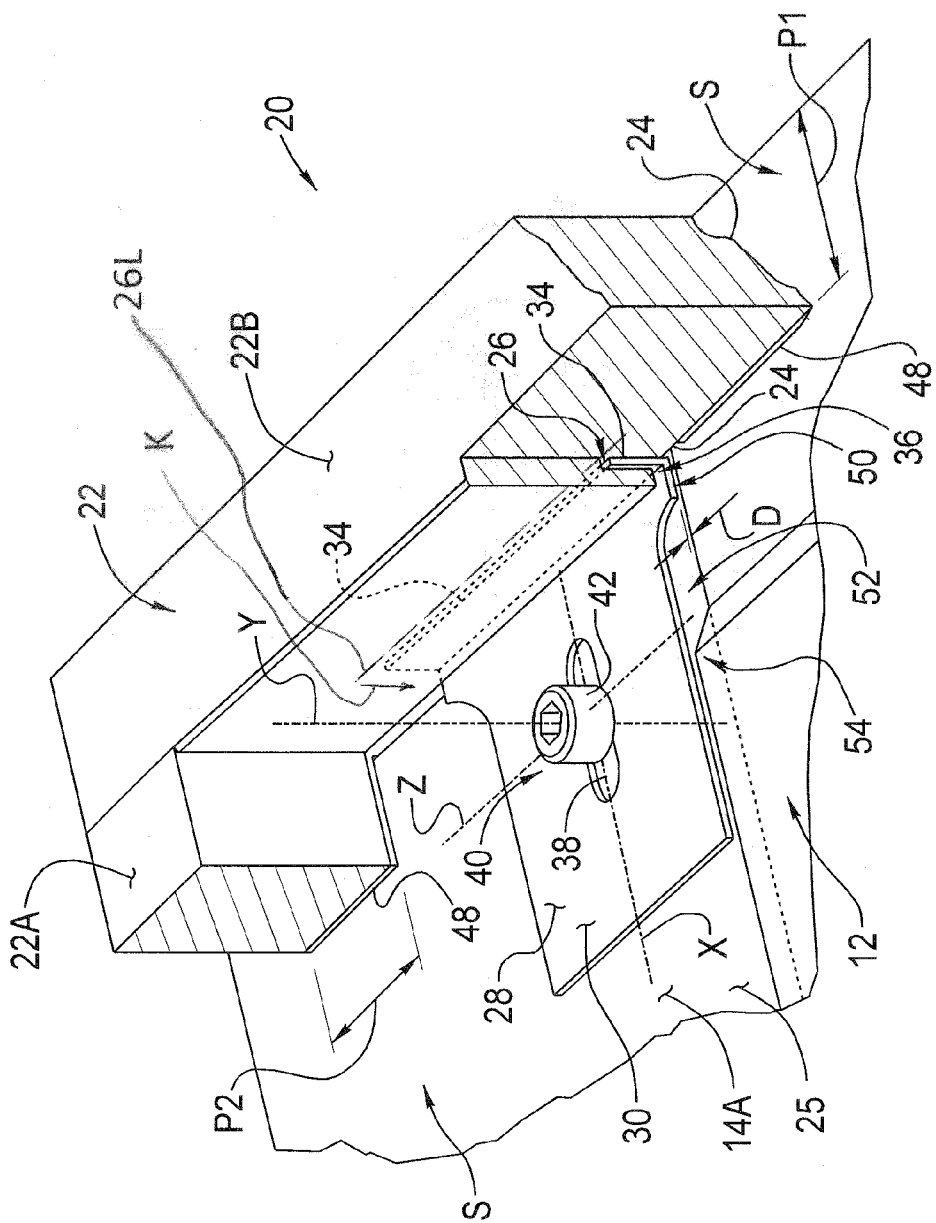
FIG. 2 is a perspective view of a portion of a fuel cell manifold seal with a portion of a manifold frame and gasket cut away to illustrate a bracket.

Referring to FIGS. 1 and 2, each of the manifolds 16 includes a manifold seal, generally designated by the numeral 20. Each manifold seal 20 includes a manifold frame 22 defining a mating surface 24. The mating surface 24 sealingly engages the sealing area S. A portion of the mating surface 24 of sections 22B and 22C has a slot 26 formed therein and extending longitudinally along a portion of the manifold frames 22B and 22C, respectively. The slot 26 extends from a line 26L in a direction indicated by the arrow K and opens towards the sealing area S. Each of the manifold seals 20 has four brackets 28, each defining a base portion 30. The base portions 30 of two of the brackets 28 are moveably secured to an outwardly facing surface 25 the end plate 14A and the base portions of the other two brackets are moveably secured to an outwardly facing surface 25 of the end plate 14B. Each of the base portions 30 has a lip 34 positioned at an edge 36 thereof and projecting substantially perpendicularly therefrom. Each of the base portions 30 are positioned inwardly from the sealing area S and the manifold frame 22. The edge 36 is positioned on a portion of the sealing area S such that the lip 34 moveably engages the slot 26. The lip 34 and the slot 26 are sized to facilitate movement therebetween and cooperate with one another to seal a gap between the mating surface 24 of respective ones of the sections 22B and 22C of the manifold frame 22 and corresponding portions of the sealing area S, caused by movement of the fuel cell stack 12, as described below with reference to FIG. 4. For example, the lip 34 is moveably engaged in and cooperates with the slot 26 to seal the gap between the mating surface 24 and the sealing area S. The manifold seal 20 can be employed on new fuel cell systems or retrofit on existing systems.

While the fuel cell system 10 is described as having four outwardly facing surfaces 18 each having a generally rectangular sealing area S, the present invention is not limited in this regard, as the manifold seal 20 can be used on fuel cell systems having any number of faces and/or sealing areas of any shape. Although the manifold seal 20 is shown and described as having four brackets 28, the present invention is not limited in this regard as more or less than four brackets can be employed, without departing from the broader aspects disclosed herein. While the fuel cell system 10 is described as including a MCFC stack, the present invention can be employed on fuel cell systems having other fuel cell stacks, including, but not limited to, solid oxide fuel cell stacks.

As illustrated in FIG. 2, the base portion 30 has a slot 38 extending therethrough and through which fastener means 40, for example, a shoulder bolt 42 extends and threads into a threaded bore (not shown) formed in the end plate 14A. In one embodiment, the slot 38 is about 0.5 inches in length. The shoulder bolt 42 is secured to the end plate 14A such that movement of the bracket 28 is limited, relative to the end plate, to rotation around an axis marked Y and translation along an axis marked X. Thus the bracket 28 is restrained from translation, along an axis marked Z, relative to the endplate 14A. One or more of the brackets 28 can be secured to the other end plate 14B, in a manner similar to that described above. While the slot is described as being about 0.5 inches in length, slots of any length can be employed without departing from the broader aspects disclosed herein.

The manifold frame 22 is substantially rigid and is manufactured from four sections 22A-D of a dielectric material to prevent electrical short circuiting between individual cells of the fuel cell stack 12. One section 22A of each of the manifold frames 22 is secured to the outwardly facing surface 25 of the end plate 14A to restrain movement of the section 22A in a direction along the Z axis. The end plate 14A is fixed to a support structure (not shown). The manifold seal 20 also includes a gasket 48 formed into a shape complementary to the manifold frame 22 and disposed between the mating surface 24 and the sealing area S. A portion of the gasket 48 is removed to accommodate the base portion 30 and the edge 36 of the bracket 28.

While the manifold frame 22 is described as being substantially rigid and manufactured from four sections of a dielectric material, the present invention is not limited in this regard as other materials can also be employed and the manifold frame can be manufactured in any number of sections without departing from the broader aspects of the present invention.

Referring again to FIG. 2, the base portion 30 has a side edge 50 positioned adjacent to the fuel cell stack 12 and separated therefrom by a distance D. The distance D is minimized so that the lip 34 can extend substantially into the gap thereby improving sealing of the gap. In addition, the base portion 30 has a relief 52 tapering inwardly from the side edge 50 to allow the bracket 28 to rotate towards the fuel cell stack 12 without interfering with a ridge portion 54 of the fuel cell stack.

Figure 3:
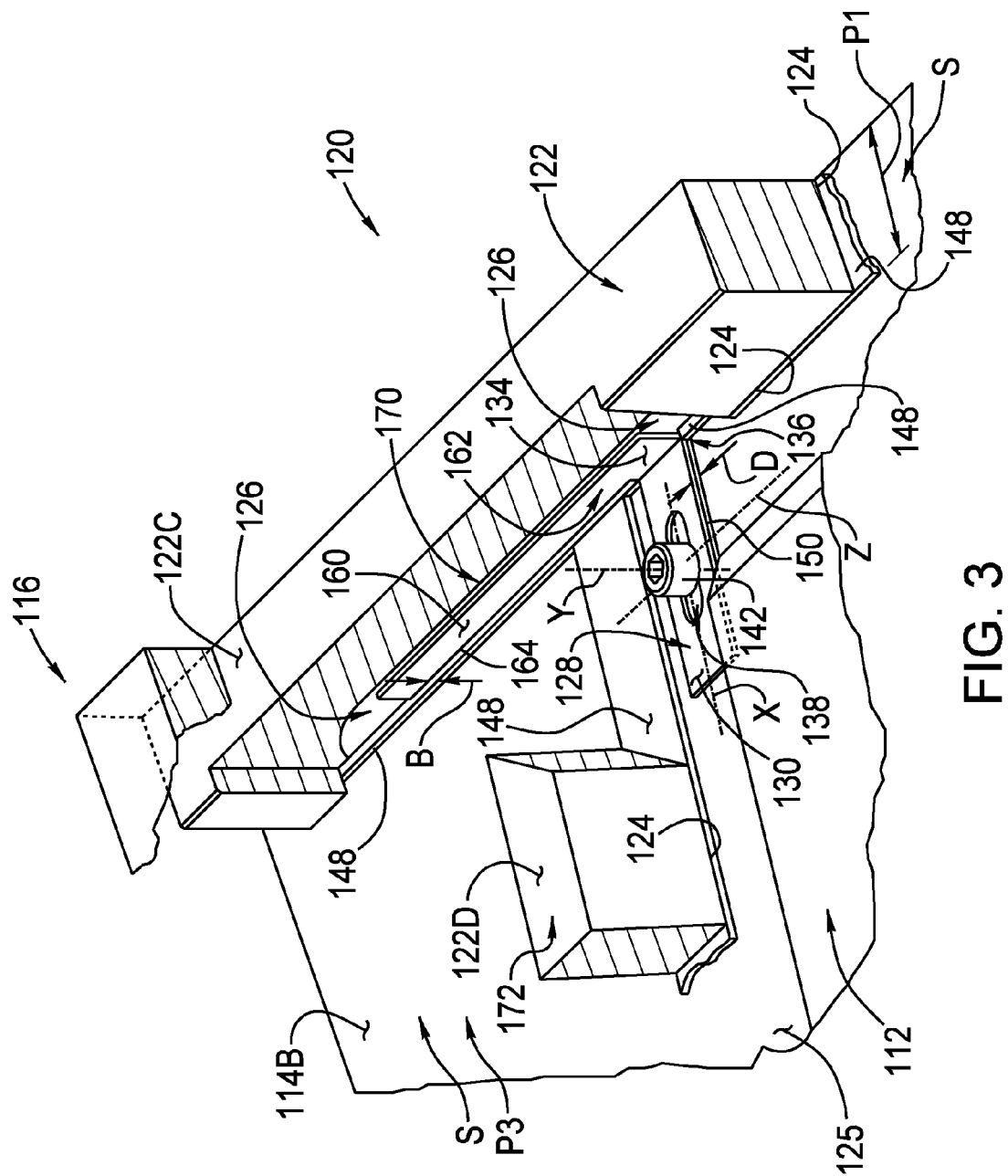
FIG. 3 is a perspective view of the manifold seal of FIG. 2 having a bracket with an elongated leg.

The manifold seal of FIG. 3 is similar to that illustrated in FIG. 2, therefore like elements are assigned like numerals, preceded by the number 1. Referring to FIG. 3, each of the manifolds 116 includes a manifold seal, generally designated by the numeral 120. Each of the manifold seals 120 has a manifold frame 122 defining a mating surface 124. The mating surface 124 sealingly engages the sealing area S through a gasket 148 positioned therebetween. A portion of the mating surface 124 of section 122C has a slot 126 formed therein and extending longitudinally along a portion 170 of each of the manifold frames 122C. Section 122B of the manifold frame 122 is configured similar to that described above for section 122C of the manifold frame 122. The mating surface 124 of a portion 172 of the section 122D of the manifold frame 122 sealingly engages the portion P3 of the sealing area S through another portion of the gasket 148.

As illustrated in FIG. 3, the manifold seal 120 includes a bracket 128, defining a base portion 130 moveably secured to an outwardly facing surface 125 of the end plate 114B. The end plate 114B is free to move relative to the other end plate 114A and the fuel cell stack 112. The base portion 130 has a lip 134 positioned at an edge 136 thereof and projecting substantially perpendicularly therefrom. The lip 134 has an elongated leg 160 extending laterally from one side 162 thereof and away from the fuel cell stack 112. The edge 136 is positioned on a portion of the sealing area S such that the lip 134, including the leg 160, moveably engages the slot 126. A portion of the gasket 148 is removed to accommodate the base portion 130 and the edge 136 of the bracket 128. A longitudinal edge 164 of the leg 160 extends over the gasket 148 and is spaced apart therefrom by a distance B to maintain a seal therebetween without damaging the gasket, when the leg moves with the end plate 114B. The lip 134 and the slot 126 are sized to facilitate movement therebetween and cooperate with one another to seal a gap between the mating surface 124 of the frame portion 122 and the sealing area S, caused by movement of the fuel cell stack 112.

As illustrated in FIG. 3, the base portion 130 has a slot 138 extending therethrough and through which fastener means 140, for example, a shoulder bolt 142 extends and threads into a threaded bore (not shown) formed in the end plate 114. The shoulder bolt 142 is secured to the end plate 114B such that movement of the bracket 128 is limited, relative to the end plate, to rotation around an axis marked Y and translation along an axis marked X. Thus the bracket 128 cannot move, along an axis marked Z, relative to the endplate 114B. In addition, the base portion 130 has a side edge 150 positioned adjacent to the fuel cell stack 112 and separated therefrom by a distance D.

Figure 4:
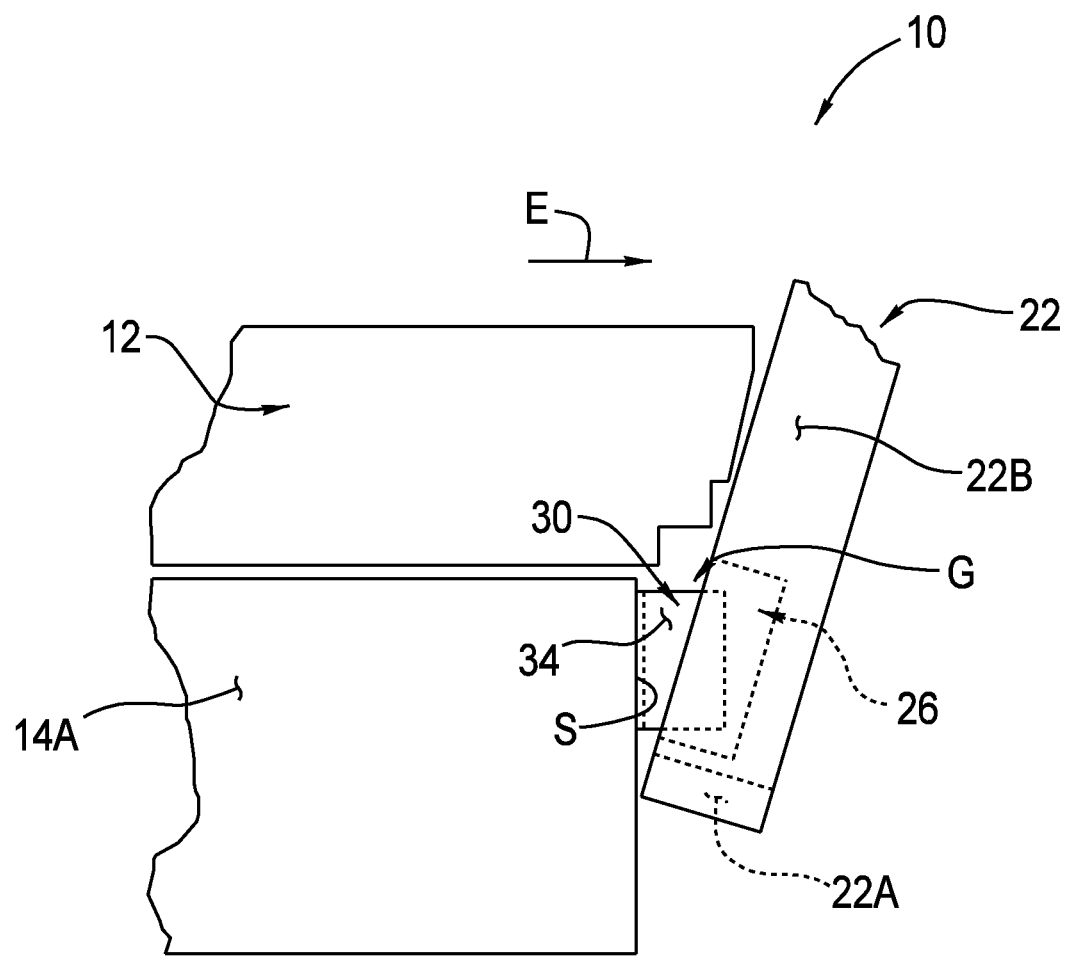
FIG. 4 is a schematic side view of a fixed end portion of the fuel cell system of FIG. 1, after operation of the fuel cell system.

Referring to FIG. 4, after many hours of operation of the fuel cell system 10, the fuel cell stack 12 expands outwardly in the general direction designated by the arrow E. Since the section 22A of the manifold frame 22 is secured to the end plate 14A and the remainder of the manifold frame is not fixed to the fuel cell stack 12 or the end plate 14B, the sections 22B, 22C and 22D of the manifold 22 are displaced outwardly in the direction of the arrow E by the fuel cell stack. As a result, a gap G is formed between the section 22B of the manifold 22 and the sealing area S, through which fluids in the manifold can escape. A similar gap is formed between the section 22C of the manifold 22 and the respective portion of the sealing area S. With the bracket 28 installed on the end plate 14A, the base portion 30 remains engaged with the end plate. In addition, a portion of the lip 34 slides out of the slot 26 and the remainder of the lip remains disposed in the slot. As a result, the lip 34 substantially seals the gap G. A portion of the mating surface 24 is moveable relative to the sealing area S between an initial state (e.g., pre-operational state) and an operating state. The gap G is defined by a position of the mating surface 24 relative to the sealing area S such that the gap G has a first area in the initial state and a second area in the operating state. The slot 26 is moveable relative to the lip 34 such that the gap G is sealed in the initial state and the operating state, by the lip 34.

Referring to FIG. 5, the fuel cell system 110 is at the beginning of life (BOL) before consolidation of the fuel cell stack 112 and before operation. At BOL, an outer surface 180 of a distal end 182 of the end plate 114B is substantially flush with a distal end 184 of the section 122C of the manifold frame 122. At BOL, the leg 160 of the bracket 128 is positioned in the slot 126 with a portion of the leg disposed in a beginning of life section 190, adjacent to one end 186 of the slot.

Referring to FIG. 6, the fuel cell system 110 is at the end of life (EOL) after many hours of operation, during which the fuel cell stack 112 compresses and the end plate 114B moves towards the other end plate 114A in the general direction of the arrow F. The bracket 128 moves with the end plate 114B causing the leg 160 to move in the slot 126 into an end of life section 192 adjacent to another end 188 of the slot.

In addition, the fuel cell stack 112 can expand outwardly as described above with reference to FIG. 4, resulting in the gap G between the section 122C of the manifold frame 122 and the sealing area S. A similar gap can be formed between section 122D of the manifold frame 122 and the respective portion of the sealing area S. However, portions of the leg 160 continue to be disposed in the slot 160 after the outward movement of the fuel cell stack 112, such that the gap G is substantially sealed.

Although the present invention has been disclosed and described with reference to certain embodiments thereof, it should be noted that other variations and modifications may be made, and it is intended that the following claims cover the variations and modifications within the true scope of the invention.

What is claimed is:

1. A manifold seal for a fuel cell system, the manifold seal comprising:
    a sealing area extending across a peripheral portion of a fuel cell stack of the fuel cell system and an edge portion of an end plate positioned on the fuel cell stack, the peripheral portion of the fuel cell stack and the edge portion of the end plate being coplanar, and the sealing area extending continuously around the peripheral portion of the fuel cell stack and the edge portion;
    a manifold frame defining a mating surface which sealingly engages said sealing area, said mating surface having a slot formed therein, said slot opening towards said sealing area and the slot being positioned entirely between inner and outer edges of the sealing area;
    a bracket defining a base portion and having a lip projecting from an edge thereof, said base portion being moveably secured to a face of said end plate so that said edge is positioned on said sealing area, and said base portion being positioned inwardly from said sealing area and said manifold frame; and
    wherein said lip is moveably engaged in and cooperates with said slot to seal a gap between said mating surface and said sealing area.

2. The manifold seal of claim 1, wherein said lip defines a leg extending laterally therefrom.

3. The manifold seal of claim 2, wherein said slot includes a beginning of stack life section and an end of stack life section, wherein said leg moves from said beginning of life section to said end of life section.

4. The manifold seal of claim 2, further comprising a space between said leg and said end plate through which a gasket is disposed, said leg slidingly engaging said gasket.

5. The manifold seal of claim 1, wherein said base portion is free to move parallel to said face of said end plate.

6. The manifold seal of claim 1, wherein said base portion is restrained from movement perpendicular to said face.

7. The manifold seal of claim 1, wherein said base portion tapers inwardly from said edge.

8. The manifold seal of claim 1, wherein said slot extends over a portion of said peripheral portion and over a portion of said portion of said end plate.

9. The manifold seal of claim 1, wherein at least a portion of said manifold comprises a dielectric material.

10. The manifold seal of claim 1, wherein a portion of said manifold frame is fixed to said end plate and remaining portions of said manifold frame are movable with respect to the fuel cell stack.

11. The manifold seal of claim 1, wherein a portion of said manifold frame is moveable, outwardly from said fuel cell stack.

12. The manifold seal of claim 1, wherein said lip projects substantially perpendicularly from said edge.

13. The manifold seal of claim 3, wherein said leg is movable from said beginning of life section to said end of life section as a result of operational consolidation of said fuel cell stack.

14. The manifold seal of claim 1, wherein during operation of the fuel cell system a portion of the lip extends out of the slot to seal the gap.

15. The manifold seal of claim 1, wherein said slot formed in said mating surface is located at a peripheral portion of the manifold frame.

16. The manifold seal of claim 1, wherein said bracket is L-shaped with said lip extending from said edge partially engaged in and cooperating with said slot to seal said gap.

17. The manifold seal of claim 16, wherein movement of said L-shaped bracket provides for said lip to remain partially engaged in and cooperating with said slot to provide a continuous seal of said gap between said mating surface and said sealing area during operation of said fuel cell system.

18. The manifold seal of claim 1, wherein:
    at least a portion of said mating surface is moveable relative to said sealing area between an initial state and operating state;
    said gap being defined by a position of said mating surface relative to said sealing area such that said gap has a first area in said initial state and a second area in said operating state; and
    said slot is moveable relative to said lip such that said gap is sealed in said initial state and said operating state.

19. The manifold seal of claim 1, wherein the lip defines a linear edge that is spaced apart from a bottom of the slot.

20. The manifold seal of claim 1, wherein the base portion is positioned inwardly from the slot.

21. The manifold seal of claim 1, wherein the bracket slidingly engages the sealing area and a portion of the manifold frame.

22. The manifold seal of claim 1, wherein the bracket is positioned between the end plate and the manifold frame.

* * * * *